Sept. 4, 1951

C. W. BECKER 2,566,478

TUNABLE MAGNETRON

Filed April 6, 1945

2 Sheets-Sheet 1

INVENTOR.
CARL W. BECKER,
BY Elmer J. Gorn
ATTY.

Sept. 4, 1951 C. W. BECKER 2,566,478

TUNABLE MAGNETRON

Filed April 6, 1945 2 Sheets-Sheet 2

INVENTOR.
CARL W. BECKER,
BY Elmer J. Gorn
ATTY.

Patented Sept. 4, 1951

2,566,478

UNITED STATES PATENT OFFICE 2,566,478

TUNABLE MAGNETRON

Carl W. Becker, Arlington, Mass., assignor to Raytheon Manufacturing Company, Newton, Mass., a corporation of Delaware Application April 6, 1945, Serial No. 586,969

14 Claims. (Cl. 315—40)

My present invention relates to electron-discharge devices, and more particularly to tunable electron-discharge devices.

While not limited thereto, my present invention is especially suitable for tuning electron-discharge devices of the so-called magnetron type.

One of the objects of my present invention is to provide means for tuning an electron-discharge device in response to an external signal.

Another object of my present invention is to so construct said tuning means that it has little inertia, thereby enabling its substantially instantaneous response to said external signal.

A further object of my present invention is to so design said tuning means that its operation utilizes the leakage field already existing in an electron-discharge device of the magnetron type.

Still another object of my present invention is to provide tuning means for an electron-discharge device which enables control from a remote point, or which enables the device, if desired, to be frequency modulated, or which lends itself, if desired, to use in an automatic frequency control system.

These, and other objects of my present invention, which will become more apparent as the detailed description thereof progresses, are attained, briefly, in the following manner:

As above indicated, my present invention is especially suitable for tuning an electron-discharge device of the magnetron type. I prefer that said device include an anode structure, made of highly conductive material, such as copper, and comprising a cylindrical body provided with a plurality of interiorly-extending, radially-disposed anode members, each adjacent pair of said anode members, together with that portion of said cylindrical body lying therebetween, constituting a resonant line.

I provide said anode structure with at least one pair of conducting straps alternately contacting successive anode members, the straps of each pair being so disposed with respect to each other as to present a capacitance therebetween, said capacitance, together with the capacitance and inductance built into the device as a function of the geometry thereof, determining the natural resonant frequency at which the device normally operates.

I further provide the device with another conducting member, preferably in the form of an annular diaphragm, which is adapted to be moved with respect to the elements of the anode structure making up the aforementioned resonant lines, whereby at least one of the electrical characteristics of said lines, for example, the distributed capacitance thereof, may be altered to thereby tune the device to a frequency other than its natural resonant frequency.

Finally, I provide means, disposed within the leakage field existing in the device, carried by the last above-mentioned conducting member, and receptive of an external signal, for controlling the magnitude and direction of the movement of said conducting member.

I have found that by this arrangement I am able to attain the objects above referred to, and others which, as stated, will later become apparent.

In the accompanying specification I shall describe, and in the annexed drawings show, two illustrative embodiments of the electron-discharge devices of my present invention. It is, however, to be clearly understood that I do not wish to be limited to the details herein shown and described for purposes of illustration only, inasmuch as changes therein may be made without the exercise of invention, and within the true spirit and scope of the claims hereto appended.

In said drawings, Fig. 1 is a longitudinal sectional view taken substantially through the center of a tunable magnetron made in accordance with the principles of my present invention;

Figures 1, 2:
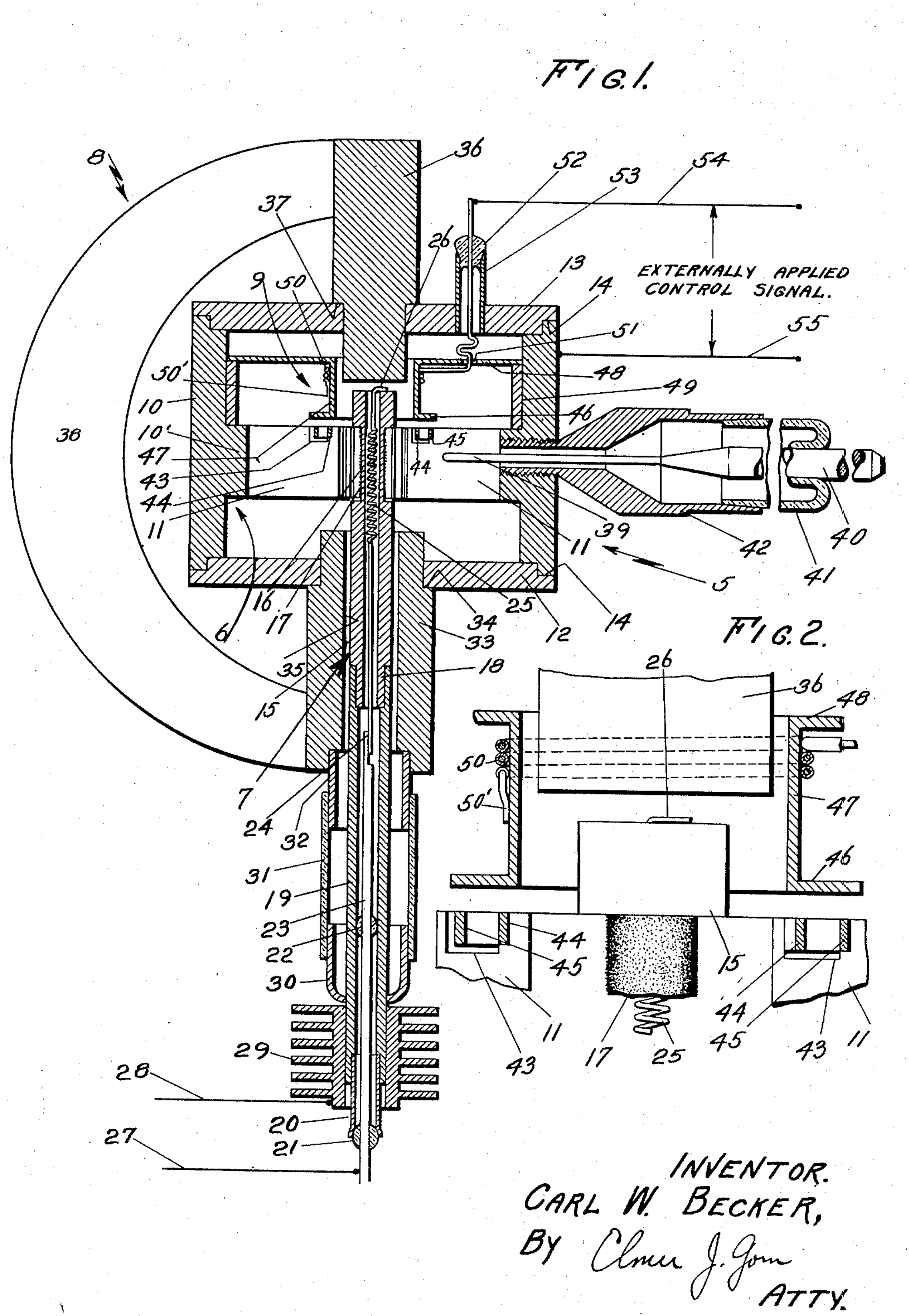
Fig. 2 is an enlarged, fragmentary view of the same, more clearly showing the physical relationships between the elements comprising the aforementioned tuning means.

Referring now more in detail to one of the aforesaid illustrative embodiment of my present invention, and with particular reference to Figs. 1 and 2 of the drawings showing the same, the numeral 5 generally designates an electron-discharge device of the so-called magnetron type. Said device comprises an anode structure 6, a cathode structure 7, magnetic means 8 for establishing a magnetic field in a direction perpendicular to the path of the electron-flow between said cathode and anode structures, and tuning means 9.

In the device shown, the anode structure 6 includes a cylindrical body 10 made of highly conductive material, such as copper, said body being provided with an interior, annular boss 10', in turn, provided with a multiplicity of radially-disposed, interiorly-extending anode members in the form of vanes 11, each adjacent pair of said vanes, together with that portion of said cylindrical body lying therebetween, constituting a resonant line, preferably, a quarter-wave line whose output end is shorted, and whose natural resonant frequency is, as is well known in the art to which my present invention relates, a function of the geometry of the physical elements making up the same. I shall further describe the anode members 11 when referring, in a later portion of this specification, to the details of the tuning means 9.

The anode structure is closed at its ends, for example, by end plates 12 and 13, with the junctions between the cylindrical body 10 of said structure, and said plates 12 and 13, hermetically sealed, as at 14.

The cathode structure 7, which is coaxial with the anode structure 6, includes a cathode sleeve 15, conventionally made of nickel, or the like, provided with a reduced portion 16 whose length, preferably, is coextensive with the width of the anode members 11, said reduced portion 16 being provided with a highly electron-emissive coating 17, for example, of the well known alkaline-earth metal oxide type.

In order properly to support the cathode sleeve 15 with respect to the anode members 11, said sleeve may be reduced, as at 18, to fit into an elongated, electrically-conductive tubular member 19 having, at its outer end, a ferrule 20 closed by a glass seal 21. Said seal, together with one or more glass beads 22 disposed within the tubular member 19, supports a lead-in conductor 23 which passes through said member 19 and has its upper end connected, as at 24, to one terminal of a cathode heating filament 25. The other terminal of said filament may be connected, as at 26, to the cathode sleeve 15.

In order to convey current to the filament 25, the lead-in conductor 23 is connected by a conductor 27 to one terminal of a suitable source of E. M. F. (not shown), the other terminal of said source of E. M. F. being connected by a conductor 28 to a heat-dissipating member 29 fixed upon the lower end of the tubular member 19.

In order properly to support the cathode 7, and insulate the same from the anode structure 6, the tubular member 19 may have fixed thereto a cup-like bushing 30 sealed into one end of a glass tube 31, the other end of said glass tube having sealed therein a tubular bushing 32, in turn, secured to a tubular pole piece 33, constituting one of the components of the magnetic means 8.

Said pole piece 33 may be hermetically sealed, as at 34, into the end plate 13, and be provided with a central bore 35 whereby the cathode structure 7 may enter the device.

Another tubular pole piece 36 may be hermetically sealed, as at 37, into the end plate 12, said pole piece and the pole piece 33 being fixed, for example, to the opposite ends of a horseshoe magnet 38 (only partially shown), whereby an appropriate magnetic field may be established, as previously indicated, in a direction perpendicular to the path of the electron-flow between the cathode structure 7 and anode structure 6.

Now, by suitably heating the cathode, and applying a proper potential difference between said cathode and the anode, the device can be made to generate electrical oscillations of a wave length determined, primarily, by the capacitance and inductance built into said device as a function of the geometry thereof, and more especially, of the dimensions of the above referred to resonant lines defined by the anode structure.

In order to extract power from the device I may, for example, introduce a loop 39 into any one of the spaces defined by any two adjacent anode members 11, said loop coupling with the magnetic component of the above-mentioned electrical oscillations. Said loop may, in turn, be connected to a conductor 40 supported in a glass seal 41 fused into an outlet pipe 42, said pipe being threaded and hermetically sealed into the cylindrical body 10 of the anode structure 6.

In the device as thus far described, there is no external control over the frequency of the generated oscillations and, furthermore, because of the numerous paths which the oscillating energy can follow within the anode structure of said device, spurious oscillations are present which reduce the efficiency of the device.

In order to eliminate these disadvantages, I proceed as follows:

Each anode member 11 is provided with a slot 43 adapted to receive concentric conducting straps 44 and 45 which are, in turn, adapted alternately to contact successive anode members. Said straps present a capacitance therebetween which enters into the determination of the natural resonant frequency of the device, and when the anode members are thus inter-connected, the spurious oscillations above referred to, become suppressed.

Now, I have found that by moving another conducting member with respect to the anode members 11, or with respect to the straps 44 and 45 thereof, the distributed capacitance or, with appropriate modifications, the distributed inductance, of the device, or both, may be altered whereby said device may be tuned to frequencies other than the natural resonant frequency thereof, and to this end, I proceed as follows:

I provide said additional conducting member, for example, in the form of an annular diaphragm 46 formed at the lower end of a hollow, cylindrical core 47. Said core depends from a flange 48 which is secured, at its periphery, to a supporting ring 49, mounted within the body 10 upon the ledge presented by the boss 10′ thereof. Wound upon the core and firmly secured thereto is a coil 50 of insulated wire, one end, 50′, of said coil being electrically connected to the core, and the other end thereof passing through an opening 51 in the flange 48, and out of the device, through a glass seal 52 fused into a pipe 53 which is hermetically sealed into the end plate 13.

The core 47 and the coil 50 carried thereby should be so disposed with respect to the pole piece 36 that said coil is within the leakage field existing between said pole piece 36 and the pole piece 33. Hence, upon application of an external signal between conductors 54 and 55, respectively connected to the coil 50 and body 10, the current flowing in said coil, and the leakage field above referred to, interact to move said coil, and the diaphragm 46 carried thereby, with respect to the anode members 11. The result of this movement is, as previously indicated, an alteration of the distributed capacitance of the device, and a consequent tuning thereof.

Figures 3, 4:
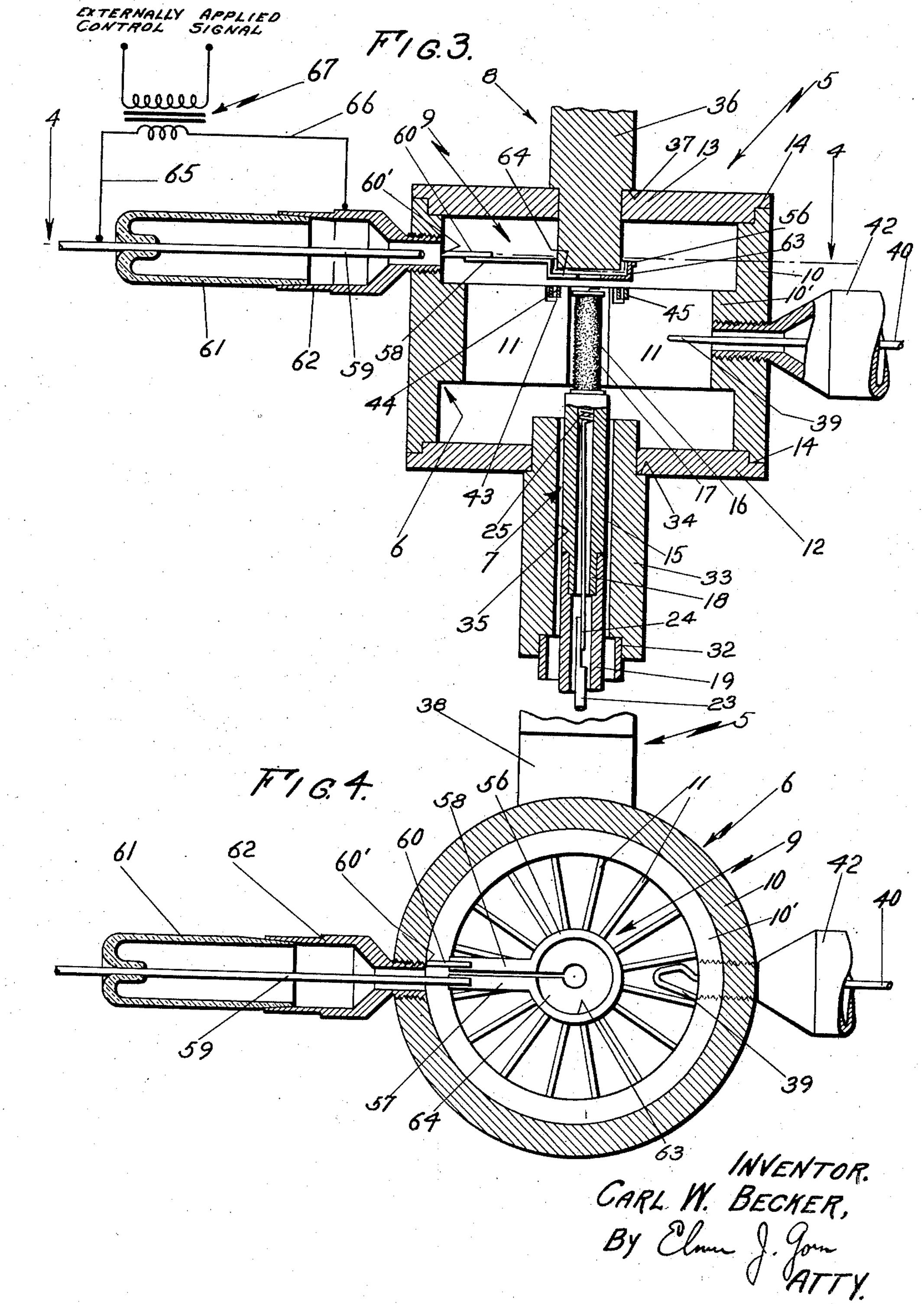
Fig. 3 is a fragmentary view, similar to Fig. 1, but showing a modified form thereof.
Fig. 4 is a transverse sectional view taken along line 4—4 of Fig. 3.

In the modification shown in Figs. 3 and 4 of the drawings, the electron-discharge device 5 is essentially the same as that shown in Figs. 1 and 2, and like parts have been designated with like reference characters.

The difference between these two embodiments is in the tuning means 9. In the modified tuning means, the coil which is adapted to cooperate with the leakage field of the device consists of a single loop 56 of thin, flat conductive material, said loop terminating in two straight leg portions 57 and 58 which may be secured, respectively, to conductors 59 and 60. The conductor 59 passes out of the device through a glass seal 61 fused into a pipe 62 which is hermetically sealed into the body 10, and the conductor 60 is electrically connected, as at 60′, to said body 10.

The loop 56 is provided with a downwardly-directed wall 63 having, at its lower end, an inwardly-directed, centrally-apertured, annular diaphragm 64, the latter cooperating with the anode members 11 in the same manner as above described in connection with the diaphragm 46.

In order to convey current to the loop 56, the conductor 59 and the pipe 62 may be connected, respectively, by conductors 65 and 66 to the secondary winding of a step-down transformer 67, the primary of said transformer being receptive of any desired control signal.

Like the coil 50, the loop 56 is disposed within the leakage field existing between the pole pieces 36 and 33, and its mode of functioning is, likewise, similar.

This completes the description of the aforesaid illustrative embodiments of my present invention. It will be noted from all of the foregoing that I have provided tuning means for an electron-discharge device of the magnetron type, which has little inertia and is, therefore, readily responsive to an external signal; which makes use of the leakage field already existing in such devices; and which is admirably adapted to operation from a remote point, or use in a frequency modulation system, or in an automatic frequency control system.

Other advantages of the tuning means of my present invention will readily occur to those skilled in the art to which the same relates.

What is claimed is:

1. The combination with an electron-discharge device which incorporates a cathode, an anode spaced from said cathode, and means for establishing a magnetic field between said cathode and anode in a direction substantially perpendicular to the path of the electron-flow therebetween: of means, supported within said device and movable with respect to said anode, for tuning said device to a frequency other than its natural resonant frequency; and means, supported by said tuning means within the leakage field of said magnetic means and receptive of an external signal, for establishing a signal-responsive magnetic field cooperable with said leakage field for controlling the movement of said tuning means.

2. The combination with an electron-discharge device which incorporates a cathode, an anode spaced from said cathode, and means for establishing a magnetic field between said cathode and anode in a direction substantially perpendicular to the path of the electron-flow therebetween: of a diaphragm, supported within said device and movable with respect to said anode, for tuning said device; and means, supported by said diaphragm within the leakage field of said magnetic means and receptive of an external signal, for establishing a signal-responsive magnetic field cooperable with said leakage field for controlling the movement of said diaphragm.

3. The combination with an electron-discharge device which incorporates a cathode, an anode spaced from said cathode, and means for establishing a magnetic field between said cathode and anode in a direction substantially perpendicular to the path of the electron-flow therebetween: of means, supported within said device and movable with respect to said anode, for tuning said device to a frequency other than its natural resonant frequency; and a coil, supported by said tuning means within the leakage field of said magnetic means and receptive of an external signal, for establishing a signal-responsive magnetic field cooperable with said leakage field for controlling the movement of said tuning means.

4. The combination with an electron-discharge device which incorporates a cathode, an anode spaced from said cathode, and means for establishing a magnetic field between said cathode and anode in a direction substantially perpendicular to the path of the electron-flow therebetween: of a diaphragm, supported within said device and movable with respect to said anode for tuning said device; and a coil, supported by said diaphragm within the leakage field of said magnetic means and receptive of an external signal, for establishing a signal-responsive magnetic field cooperable with said leakage field for controlling the movement of said diaphragm.

5. A tunable electron-discharge device comprising: a cathode; an anode structure, spaced from said cathode, and provided with at least two anode members; each pair of adjacent anode members, together with that portion of said anode structure lying therebetween, constituting a cavity resonator; means adjacent said anode structure for establishing a magnetic field between said cathode and anode structure in a direction substantially perpendicular to the path of the electron-flow therebetween; means, supported within said device and movable with respect to said anode structure, for altering at least one electrical characteristic of each such cavity resonator; and means, supported by said last-named means within the leakage field of said magnetic means and receptive of an external signal, for establishing a signal-responsive magnetic field cooperable with said leakage field for controlling the movement of said last-named means.

6. A tunable electron-discharge device comprising: a cathode; an anode structure, spaced from said cathode, and provided with at least two anode members; each pair of adjacent anode members, together with that portion of said anode structure lying therebetween, constituting a cavity resonator; means adjacent said anode structure for establishing a magnetic field between said cathode and anode structure in a direction substantially perpendicular to the path of the electron-flow therebetween; means, supported within said device and movable with respect to said anode structure, for altering the distributed capacitance of each of said cavity resonators; and means, supported by said capacitance-altering means within the leakage field of said magnetic means and receptive of an external signal, for establishing a signal responsive magnetic field cooperable with said leakage field for controlling the movement of said capacitance-altering means.

7. A tunable electron-discharge device comprising: a cathode; an anode structure, spaced from said cathode, and provided with at least two anode members; each pair of adjacent anode members, together with that portion of said anode structure lying therebetween, constituting a cavity resonator; means adjacent said anode structure for establishing a magnetic field between said cathode and anode structure in a direction substantially perpendicular to the path of the electron-flow therebetween; a diaphragm, supported by said anode structure and movable with respect to said anode members, for altering the distributed capacitance of each of said cavity resonators; and means, supported by said diaphragm within the leakage field of said magnetic means and receptive of an external signal, for establishing a signal-responsive magnetic field cooperable with said leakage field for controlling the movement of said diaphragm.

8. A tunable electron-discharge device comprising: a cathode; an anode structure, spaced from said cathode, and provided with at least two anode members; each pair of adjacent anode members, together with that portion of said anode structure lying therebetween, constituting a cavity resonator; means adjacent said anode structure for establishing a magnetic field between said cathode and anode structure in a direction substantially perpendicular to the path of the electron-flow therebetween; means, supported within said device and movable with respect to said anode structure, for altering at least one electrical characteristic of each of said cavity resonators; and a coil, supported by said last-named means, within the leakage field of said magnetic means and receptive of an external signal, for establishing a signal-responsive magnetic field cooperable with said leakage field for controlling the movement of said last-named means.

9. A tunable electron-discharge device comprising: a cathode; an anode structure, spaced from said cathode, and provided with at least two anode members; each pair of adjacent anode members, together with that portion of said anode structure lying therebetween, constituting a cavity resonator; means adjacent said anode structure for establishing a magnetic field between said cathode and anode structure in a direction substantially perpendicular to the path of the electron-flow therebetween; a diaphragm, supported within said device and movable with respect to said anode members, for altering the distributed capacitance of each of said cavity resonators; and a coil, supported by said diaphragm within the leakage field of said magnetic means and receptive of an external signal, for establishing a signal-responsive magnetic field cooperable with said leakage field for controlling the movement of said diaphragm.

10. A tunable electron-discharge device comprising: a cathode; an anode structure, spaced from said cathode, and provided with at least two anode members; each pair of adjacent anode members, together with that portion of said anode structure lying therebetween, constituting a cavity resonator; means adjacent said anode structure for establishing a magnetic field between said cathode and anode structure in a direction substantially perpendicular to the path of the electron-flow therebetween; a pair of conductors alternately contacting at least two successive anode members; said conductors providing a capacitance therebetween; means, supported within said device and movable with respect to said conductors, for altering said interconductor capacitance; and means, supported by said capacitance-altering means within the leakage field of said magnetic means and receptive of an external signal, for establishing a signal-responsive magnetic field cooperable with said leakage field for controlling the magnitude and direction of the movement of said capacitance-altering means.

11. A tunable electron-discharge device comprising: a cathode; an anode structure, spaced from said cathode, and provided with at least two anode members; each pair of adjacent anode members, together with that portion of said anode structure lying therebetween, constituting a cavity resonator; means adjacent said anode structure for establishing a magnetic field between said cathode and anode structure in a direction substantially perpendicular to the path of the electron-flow therebetween; a pair of conductors alternately contacting at least two successive anode members; said conductors providing a capacitance therebetween; a diaphragm, supported within said device and movable with respect to said conductors, for altering said interconductor capacitance; and means, supported by said diaphragm within the leakage field of said magnetic means and receptive of an external signal, for establishing a signal-responsive magnetic field cooperable with said leakage field for controlling the magnitude and direction of the movement of said diaphragm.

12. A tunable electron-discharge device comprising: a cathode; an anode structure, spaced from said cathode, and provided with at least two anode members; each pair of adjacent anode members, together with that portion of said anode structure lying therebetween, constituting a cavity resonator; means adjacent said anode structure for establishing a magnetic field between said cathode and anode structure in a direction substantially perpendicular to the path of the electron-flow therebetween; a pair of conductors alternately contacting at least two successive anode members; said conductors providing a capacitance therebetween; means, supported within said device and movable with respect to said conductors, for altering said interconductor capacitance; and a coil, supported by said last-named means within the leakage field of said magnetic means and receptive of an external signal, for establishing a signal-responsive magnetic field cooperable with said leakage field for controlling the magnitude and direction of the movement of said capacitance-altering means.

13. A tunable electron-discharge device comprising: a cathode; an anode structure, spaced from said cathode, and provided with at least two anode members; each pair of adjacent anode members, together with that portion of said anode structure lying therebetween, constituting a cavity resonator; means adjacent said anode structure for establishing a magnetic field between said cathode and anode structure in a direction substantially perpendicular to the path of the electron-flow therebetween; a pair of conductors alternately contacting at least two successive anode members; said conductors providing a capacitance therebetween; a diaphragm, supported within said device and movable with respect to said conductors, for altering said interconductor capacitance; and a coil, supported by said diaphragm within the leakage field of said magnetic means and receptive of an external signal, for establishing a signal-responsive magnetic field cooperable with said leakage field for controlling the magnitude and direction of the movement of said diaphragm.

14. A tunable electron-discharge device comprising: a cathode; an anode structure, spaced from said cathode, and including a cavity resonator; means adjacent said anode structure for establishing a magnetic field between said cathode and said anode structure in a direction transverse to the discharge path therebetween; and a coil, flexibly supported within said device in the region of the leakage field of said magnetic means, and movable with respect to said anode structure for tuning said cavity resonator; said coil being receptive of an external signal for producing a second magnetic field cooperable with said leakage field for controlling the movement of said coil.

CARL W. BECKER.

REFERENCES CITED

The following references are of record in the file of this patent:

UNITED STATES PATENTS

| Number | Name | Date |
|---|---|---|
| 2,312,919 | Litton | Mar. 2, 1943 |
| 2,374,810 | Fremlin | May 1, 1945 |
| 2,408,234 | Spencer | Sept. 24, 1946 |
| 2,422,465 | Bondley | June 17, 1947 |
| 2,444,419 | Bondley | July 6, 1948 |
| 2,444,435 | Fisk | July 6, 1948 |

FOREIGN PATENTS

| Number | Country | Date |
|---|---|---|
| 537,518 | Great Britain | June 25, 1941 |